United States Patent [19]
Meyer

[11] Patent Number: 6,076,180
[45] Date of Patent: *Jun. 13, 2000

[54] METHOD FOR TESTING A CONTROLLER WITH RANDOM CONSTRAINTS

[75] Inventor: James W. Meyer, Shoreview, Minn.

[73] Assignee: Micron Electronics, Inc., Nampa, Id.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/880,351

[22] Filed: Jun. 23, 1997

[51] Int. Cl.[7] ........................................ G06F 11/00
[52] U.S. Cl. ..................... 714/742; 714/735; 714/736; 714/737; 710/15
[58] Field of Search ................... 395/835, 842, 395/183.14, 856, 800.01, 309, 830, 727, 305, 425, 500, 600, 275, 325; 710/9, 5, 15, 126, 129; 712/31, 225, 227; 714/30, 724, 735, 736, 742, 36, 738, 715

[56] References Cited

U.S. PATENT DOCUMENTS

| | | |
|---|---|---|
| 5,133,060 | 7/1992 | Weber et al. . |
| 5,274,773 | 12/1993 | Squires et al. . |
| 5,291,585 | 3/1994 | Sato et al. . |
| 5,295,247 | 3/1994 | Chang et al. ........................ 395/325 |
| 5,363,121 | 11/1994 | Freund . |
| 5,412,666 | 5/1995 | Squires et al. . |
| 5,434,722 | 7/1995 | Bizjak et al. . |
| 5,446,877 | 8/1995 | Liu et al. . |
| 5,457,694 | 10/1995 | Smith . |
| 5,497,490 | 3/1996 | Harada et al. . |
| 5,511,227 | 4/1996 | Jones . |
| 5,519,882 | 5/1996 | Asano et al. . |
| 5,530,848 | 6/1996 | Gilbert et al. . |
| 5,530,960 | 6/1996 | Parks et al. ........................... 710/5 |
| 5,535,419 | 7/1996 | O'Brien . |
| 5,574,855 | 11/1996 | Rosich et al. . |
| 5,581,715 | 12/1996 | Verinsky et al. ..................... 710/129 |
| 5,590,336 | 12/1996 | Parry ................................... 395/727 |
| 5,613,162 | 3/1997 | Kabenjian ............................ 395/842 |
| 5,644,705 | 7/1997 | Stanley . |
| 5,649,233 | 7/1997 | Chen ................................... 395/800 |
| 5,675,731 | 10/1997 | Fuller .............................. 395/183.14 |
| 5,678,064 | 10/1997 | Kulik et al. . |
| 5,758,106 | 5/1998 | Fenwick et al. ..................... 395/305 |
| 5,771,398 | 6/1998 | Park . |
| 5,805,921 | 9/1998 | Kikinis et al. ....................... 395/822 |
| 5,832,418 | 11/1998 | Meyer . |
| 5,937,173 | 8/1999 | Olarig et al. ........................ 710/126 |
| 5,951,667 | 9/1999 | Abramson ........................... 710/129 |

Primary Examiner—Joseph E. Palys
Assistant Examiner—Rijue Mai
Attorney, Agent, or Firm—Knobbe, Martens, Olson & Bear, LLP

[57] ABSTRACT

A method for testing an IDE controller with random constraints, the method comprising: providing an IDE controller model having a primary and a secondary channel and a host interface; transmitting data patterns to a primary and a secondary device model; receiving the data patterns from the primary and secondary device models; arbitrating the transfer of the data patterns to and from the primary and secondary device models; and determining whether the data patterns returned from the primary and secondary device models match expected values.

20 Claims, 6 Drawing Sheets

METHOD FOR TESTING A CONTROLLER WITH RANDOM CONSTRAINTS

FIELD OF THE INVENTION

The present invention relates to a method for testing a controller using random pattern generation techniques. More particularly, the present invention relates to a method for testing an integrated drive electronics (IDE) controller model by use of a computer simulation environment.

BACKGROUND OF THE INVENTION

An IDE controller is a device which controls the flow of data traffic between the main memory of a computer system and one or more peripheral devices, coupled to the computer system via the IDE controller. One such peripheral device, for example, is an IDE disk drive. When employed in a personal computer system, an IDE controller must be proven to operate with many different types of IDE devices, such as hard disk drives, CD ROMs, etc. A typical IDE controller has many programmed modes of operation which must be tested to effectively verify that the IDE controller functions for its intended purpose. Therefore, it is necessary to test combinations of many parameters in order to ensure compatibility with all such disk drives. Also, variations in speed and features are numerous in modern IDE disk drive models making the design of an IDE controller that properly functions with these operational variations even more difficult. An apparatus for testing IDE controllers, commonly known as a "test bench," may test, for example, combinations of the following parameters: 1. Drive Transfer Mode (single-word DMA, multi-word DMA, synchronous DMA, programmed IO); 2. Drive Under Test (master or slave drive); 3. Timing Parameters (command pulse width, relaxation time, set-up time, pause time); 4. Transfer size (16 or 32 bit-wide transfers, number of sections); 5. Prefetch or Read Ahead Mode (enabled, disabled); and 6. Bus Mastering constraints (PRD, memory starting address, transfer byte count, single/multi-PRD transfers).

Previous methods of testing IDE controller designs required an on-line human operator to choose a particular combination of test constraints for each individual test case. After a particular combination of constraints was tested, the operator would then formulate another combination of test constraints and run that test, and so on. This "human centered" approach to IDE controller testing is cumbersome and often results in inadequate testing of an IDE controller due to human error or a lack of human resources. Therefore, a more efficient and comprehensive method of testing IDE controller models is needed.

SUMMARY OF THE INVENTION

The present invention addresses the above and other needs by providing a method of testing IDE controller models, which are simulated in a computer system, in a comprehensive fashion with minimal human resources. Through software, a "test bench" is set up which includes simulations of an IDE controller model (HDL description or gate level rendition), a bus functional model (BFM) used to generate input/output traffic over a host interface, and models of IDE compatible devices. This test bench is then compiled into a logic simulation environment and operated.

In one embodiment of the invention, a method of testing an IDE controller includes: providing an IDE controller model having a primary and a secondary channel and a host interface; transmitting data patterns to a primary and a secondary device model; receiving the data patterns from the primary and secondary device models; arbitrating the transfer of the data patterns to and from the primary and secondary device models; and determining whether the data patterns returned from the primary and secondary device models match expected values.

In another embodiment, the method described above further includes the acts of: generating random test constraints, programming the IDE controller with the random test constraints, and randomly generating the data patterns. One method of implementing the acts of generating the random test constraints and data patterns includes the acts of: generating a random binary number having a specified number of bits, wherein the random test constraints and the random data patterns are each represented by at least one bit of the random binary number.

In a further embodiment, a method of testing an IDE controller includes the acts of: providing an IDE controller model having primary and secondary channels and a host interface; testing the primary channel by transmitting a first set of test data across the primary channel; testing the secondary channel by transmitting a second set of test data across the secondary channel, wherein the secondary channel is tested concurrently with the primary channel; and arbitrating access to the host interface between the primary and secondary channels. As used herein, the term "concurrently" refers to the condition in which two or more steps, processes or procedures are occurring at the same time. The two or more steps, processes or procedures may occur dependently or independently of one another.

The embodiments of the invention disclosed herein overcome the above-referenced long-standing problems in the IDE controller industry by providing a method which automatically and comprehensively tests IDE controller models which are simulated in a computer simulation environment. By generating random test constraints in accordance with specified criteria, the invention significantly reduces the amount of time a human operator needs to spend in testing each IDE controller model. Additionally, the concurrent testing of two or more channels of the IDE controller model further reduces the testing time of an IDE controller model when compared to testing each channel of the IDE controller model separately.

DETAILED DESCRIPTION OF THE INVENTION

Figure 1:
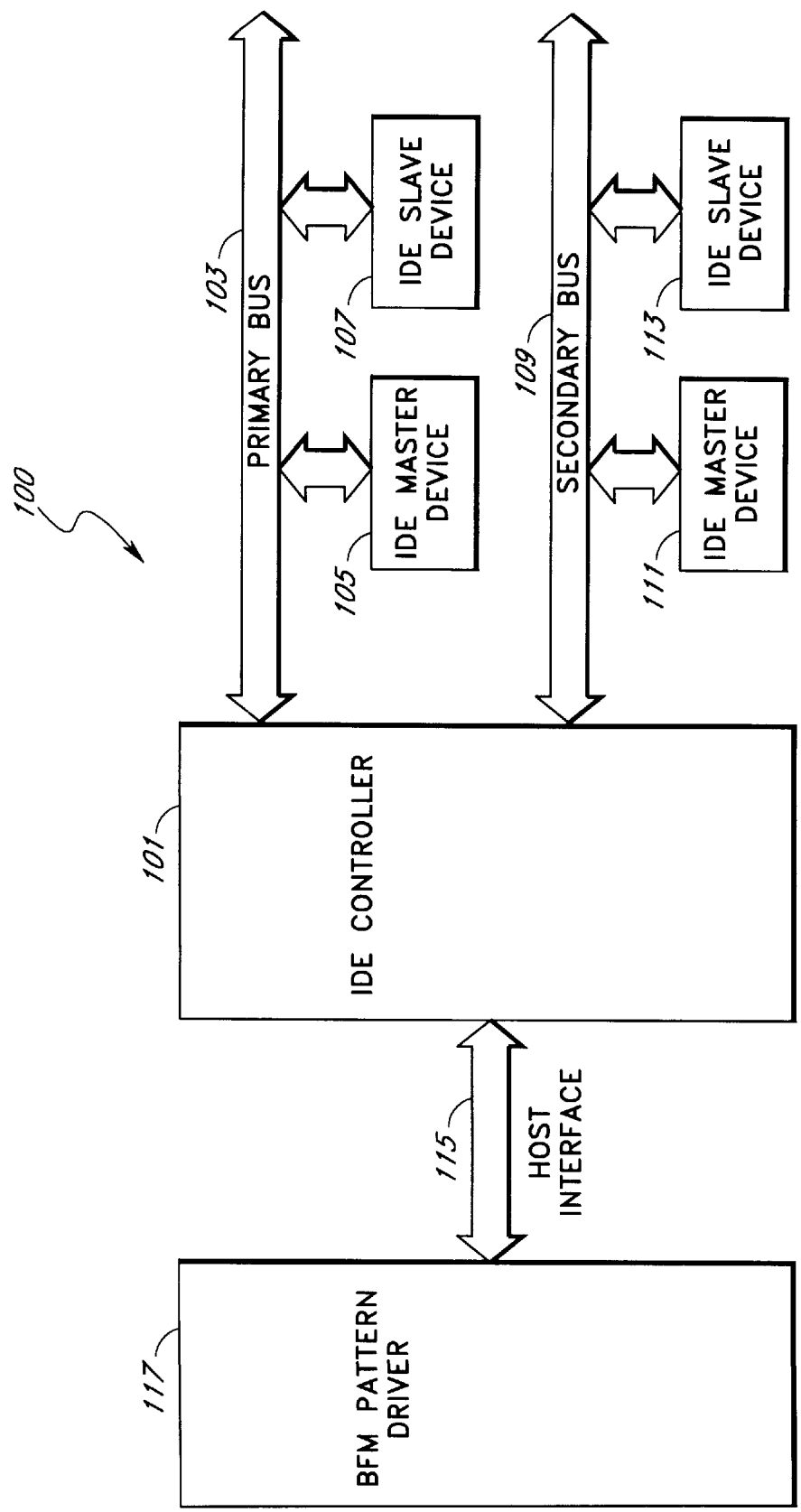
FIG. 1 is a block diagram of an IDE controller test bench in accordance with the invention.

The invention is described below with reference to the Figures wherein like parts are designated with like reference numerals throughout.

Referring to FIG. 1, a test bench 100 in accordance with the present invention, is simulated in a computer system (not shown) via software, and includes an IDE controller model 101 having a primary channel 103, and primary master and slave devices 105 and 107, respectively, coupled to the primary channel 103. The test bench 100 further includes a secondary channel 109 and secondary master and slave devices 111 and 113, respectively, coupled to the secondary channel 109. The test bench 100 further includes a bus functional model (BFM) pattern driver 117 and a host interface 115 which is connected between the BFM pattern driver 117 and the IDE controller 101. Each of these models and/or components are created in a simulation environment. For example, in one embodiment, an IDE controller model is simulated by a software module written in Very High Definition Language (VHDL). As used herein the term "module" refers to software code which defines one or more functions, procedures and/or devices. For example, an "IDE controller module" refers to a software code that simulates the operations and characteristics of a desired IDE controller model.

A VHDL design is typically composed of several blocks which are connected together to form a complete design. Using the schematic capture approach to design, complete circuits may be simulated. Each block in VHDL is analogous to an off-the-shelf part and is called an entity. The entity describes the interface to that block and how that block operates. The interface description is like a pin description of an electrical component found in a databook, specifying the inputs and outputs of the block. The description of the operation of the part is organized like a schematic diagram of the part.

In a VHDL module of an IDE controller model, for example, the first line typically includes the name of the entity, "IDE controller," and the last line typically marks the end of the VHDL program definition. The lines in between, called the port clauses, describe the interfaces to the design and contain a list of interface declarations each of which define one or more signals that are inputs or outputs to the design. Each interface declaration contains a list of names, a mode, and a type. A signal mode specifies whether a signal is an input (in), output (out) or both (in/out). The type specifies what kind of values the signal can have. For example, type "bit," is used to represent two-level logic signals.

Another part of the VHDL description of the IDE controller is a description of how the controller operates. This is defined by the architecture declaration which is typically in the form of a dataflow description or a structural, component level description of the controller.

Referring again to FIG. 1, the BFM pattern driver 117 is created and programmed to automatically configure the IDE controller 101 with a set of operational constraints, or parameters. The BFM pattern driver 117 is further programmed to perform one or more data transfers to and from the IDE controller 101, and verify that the data patterns are identical to expected values. Furthermore, many of the constraints configured by the BFM pattern driver 117 may be based on a random number as will be explained in greater detail below.

The BFM pattern driver 117 can potentially test all the features of a given IDE controller 101, leading to a more complete verification of the IDE controller design. Furthermore, since the verification of the primary and secondary channels 103, 109 can occur concurrently, potential IDE controller problems relating to primary and secondary channel synchronization or interdependence can be tested more thoroughly than conventional methods. Additionally, the automated nature of the BFM pattern driver 117 ensures accurate comparison to precomputed results. The structure and operation of the BFM pattern driver is described in further detail below with respect to FIG. 3.

In the system of FIG. 1, a test algorithm, which is compatible with the ATA (AT-attachment) standard and similar to popular disk drive software implemented in computer BIOS (Basic Input Output System) systems is transformed into VHDL and planted into the BFM pattern driver 117. Each I/O instruction executed by this algorithm is transformed into a corresponding Host Bus read or write command which is the basis for the BFM pattern driver. This algorithm may be replicated inside the BFM pattern driver so that two copies of it can run concurrently. One copy is assigned to control the primary IDE channel 103, and the other to control the secondary IDE channel 109. During the running of each test algorithm, the BFM pattern driver 117 serves the role of a host CPU by generating data patterns to be transmitted to a designated IDE drive, receiving data from the designated IDE drive and sending read and write commands to the IDE controller 101 via the host interface 115. This test algorithm, which is executed by the BFM pattern driver 117, is described in greater detail below with respect to FIG. 4.

Figure 2:
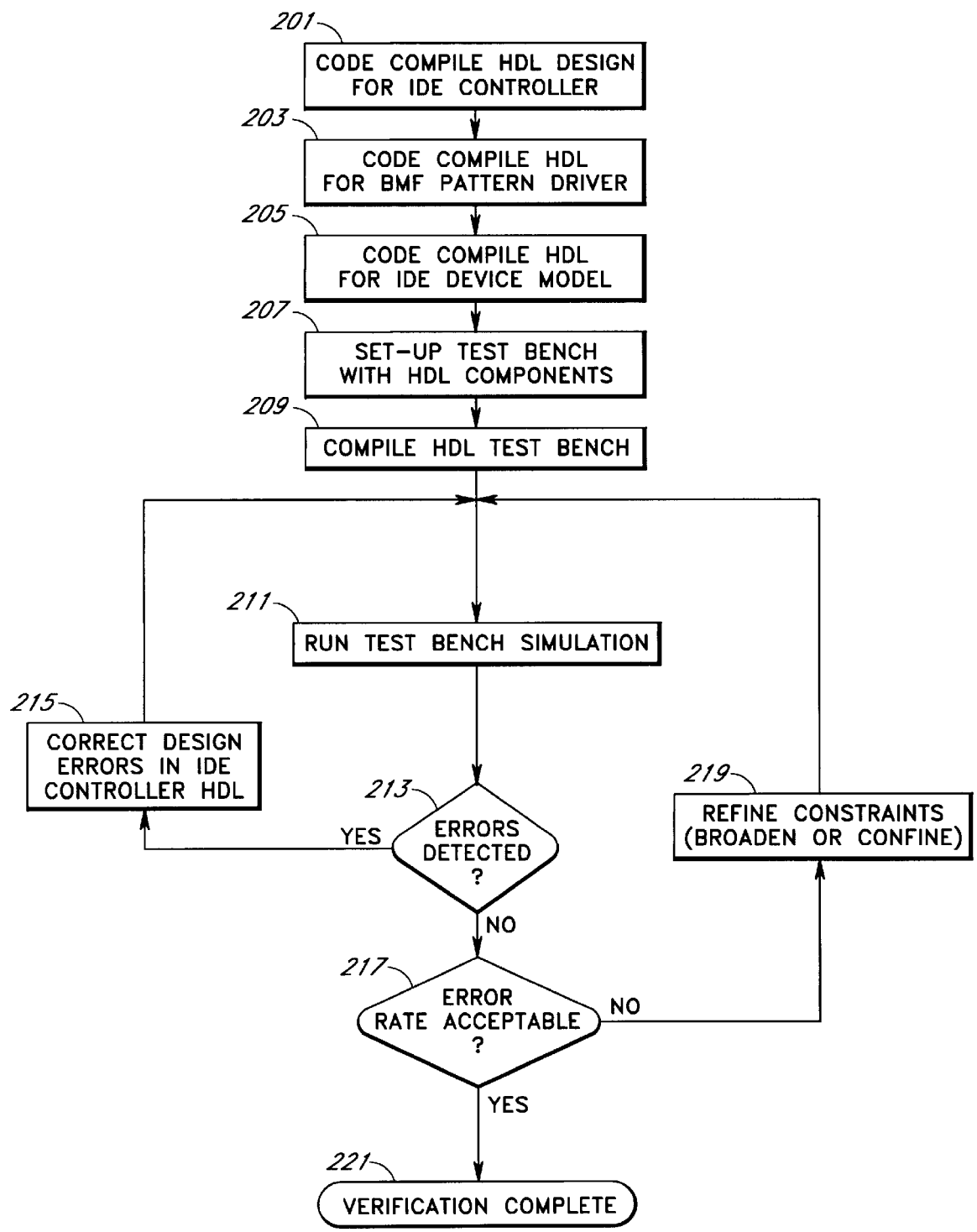
FIG. 2 is a flowchart illustrating the process of creating an IDE controller test bench and subsequently testing a particular IDE controller model.

Referring to FIG. 2, a flowchart of one method of testing an IDE controller model in accordance with the present invention is shown. In block 201, the VHDL code is created for the IDE controller model 101 (FIG. 1) and compiled. In block 203, the VHDL code for a BFM pattern driver 117 (FIG. 1) is created and compiled. Next, in block 205, the VHDL code for an IDE device model 105 (FIG. 1) is created and compiled. If more than one IDE device model is to be connected to the IDE controller model 101, similar VHDL codes for each additional IDE device model, 107, 111 and 113 (FIG. 1) are created and compiled in accordance with block 205. In block 207, the test bench model is set up by connecting all of the VHDL models which were created in blocks 201, 203 and 205 above. Finally, in block 209, the VHDL test bench model is compiled. At this point, the VHDL test bench simulation is now ready to test the IDE controller model 101 which was created in block 201.

The VHDL test bench simulation program includes the test algorithm, discussed above, which runs a test procedure for testing the IDE controller 101. Two copies of this test algorithm are run concurrently for simultaneously testing each channel 103, 109 of the IDE controller 101. Thus, in block 211, the test bench simulation program concurrently runs these two test algorithms. As mentioned above, the operation of these test algorithms are described in further detail below with respect to FIG. 4. In block 213, after each iteration of the test algorithm, the test bench program will determine if errors were detected by the test algorithm.

If an error is detected in block 213, the test bench program will move to block 215 in which the operator is prompted to correct the design errors in the IDE controller model. Using one of many well-known debugging tools which are compatible with VHDL, an operator may view the input/output values and/or the waveforms generated by the test bench VHDL program. Through this analysis a user may identify errors in logic or structural design and thereafter, update the VHDL source code to correct these errors. After the VHDL source code has been updated or corrected, it is then recompiled and rerun for further testing of the IDE controller model.

The test bench keeps track of the number of errors that were detected in successive iterations of the test algorithm for each channel. In block 215, after a specified number of iterations of the test algorithm have been completed, if the next iteration does not detect an error in block 213, the test bench program will prompt the operator to determine if the error rate is acceptable. An operator then determines whether the error rate is acceptable by comparing the error rate to specified criteria, e.g., greater than 1 error per 100 test runs equals unacceptable error rate. In block 219, if it is determined that the error rate is not acceptable in block 215, the test bench program prompts an operator to refine the constraints of the parameters used to test the IDE controller model. At this point, the operator may refine one or more "static" constraints and rerun the simulation program. As is explained in greater detail below, a "static" constraint, as opposed to a "random" constraint, remains constant throughout the testing of a particular IDE controller design and can be established at the onset of a simulation test run by the operator. If in block 217 it is determined that the error rate is acceptable, the verification of the IDE controller model is complete.

Figure 3:
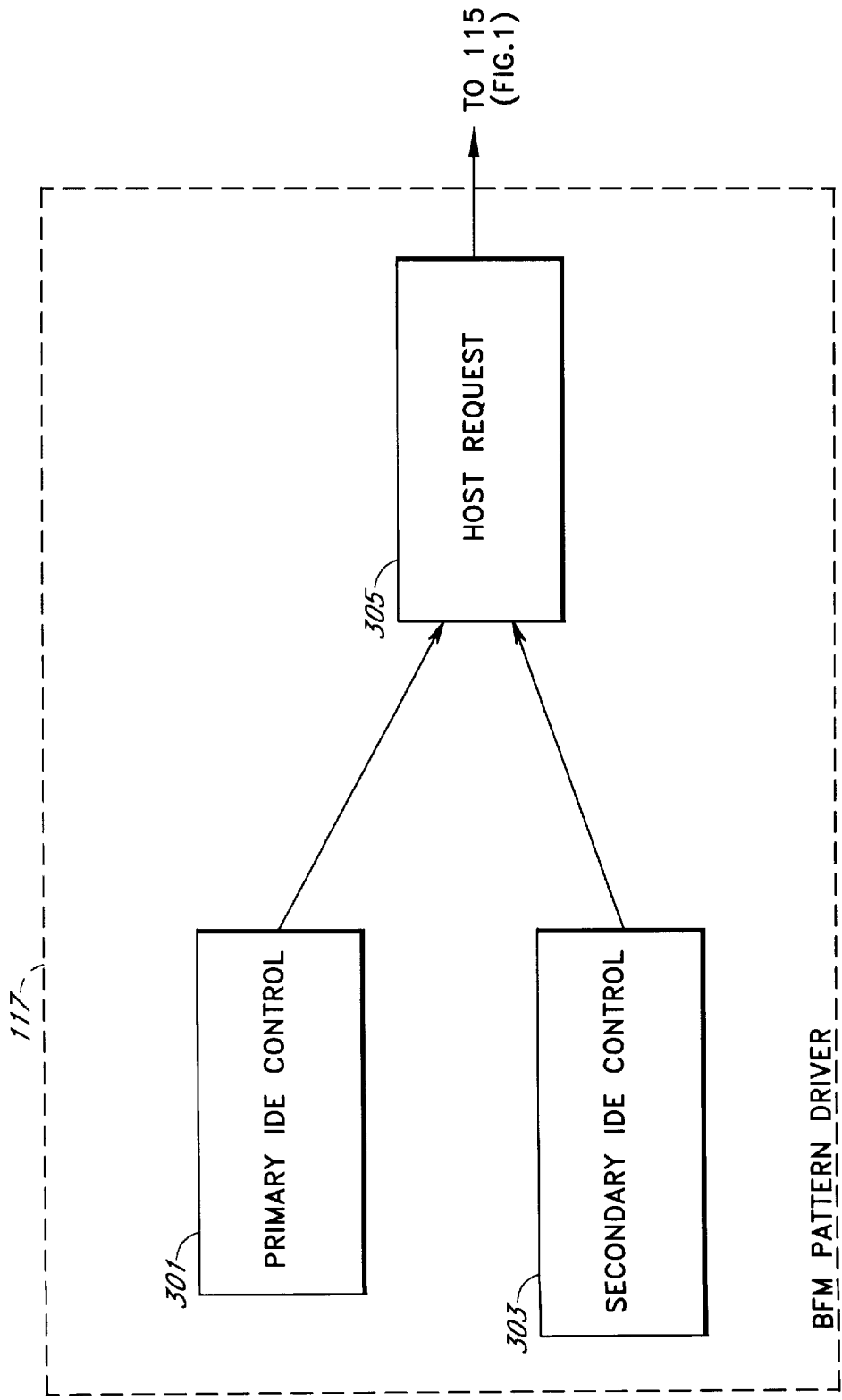
FIG. 3 is a block diagram of a BFM pattern driver which includes a primary IDE control module, a secondary IDE control module and a host request module, in accordance with the invention.

Referring to FIG. 3, one embodiment of the BFM pattern driver 117 includes a primary IDE control module 301 and a secondary IDE control module 303. Both the primary and secondary IDE control modules 301, 303 are connected to the host interface 115 (FIG. 1) through a host request module 305. Each of the modules in FIG. 3 labeled "primary IDE control" 301 and "secondary IDE control" 303 contain a copy of the aforementioned test algorithm for running the test bench simulation program. Each block of this algorithm requires transmission of a read or write command to the IDE controller via the BFM pattern driver's host request module 205. The test algorithm contained in these control modules is patterned after the I/O instructions found within typical BIOS programs, which are well-known in the art.

Each control module, 301, 303, communicates its read or write instructions to the IDE controller 101 (FIG. 1) via the host request module 305 shown in FIG. 3. If each control module is running concurrently, and if only one read or one write command can be active on the host interface 115 (FIG. 1) at one time, the host request module may arbitrate between the instructions of the primary and secondary control modules, 301 and 303, respectively. Therefore, if the IDE controller model 101 contains two channels 103, 109 (FIG. 1) which are running test operations concurrently, the test bench may synchronize between the operations within each channel 103, 109, and may arbitrate between each of the read and/or write commands executed during each block of the algorithm performed by both channels 103 and 109. By means of this arbitration process, the testing of the primary and secondary channels 103, 109 by the primary and secondary control modules 301, 303, respectively, may be synchronized such that the testing of the secondary channel 109 can occur concurrently with the testing of the primary channel 103. By taking turns in executing commands and in transferring data across the host interface 115, the primary and secondary test algorithms may simultaneously test the primary and secondary channels, 103, 109 respectively. This arbitration process may be performed by the host request module 305 of the BFM pattern driver 117 and is described in further detail below with reference to FIG. 5.

Figure 4:
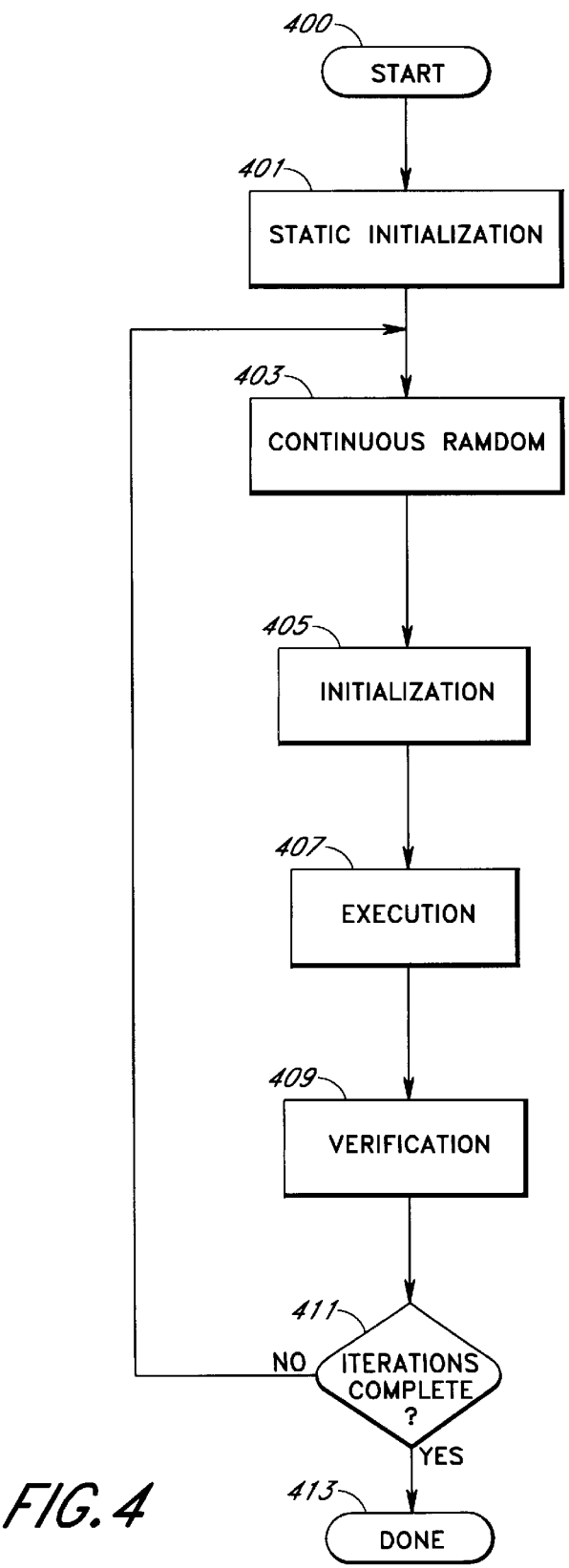
FIG. 4 is a process flowchart illustrating a test algorithm executed for each channel of an IDE controller, the primary and secondary, by the respective IDE control modules of the BFM pattern driver shown in FIG. 3.

FIG. 4 shows a test algorithm for testing one channel of an IDE controller. This test algorithm is constructed in VHDL programming language and is replicated within the BFM pattern driver 117. The modules of this test algorithm are defined as the "static initialization,""continuous random, ""initialization,""execution," and "verification" modules. In block 400, a computer (not shown) which runs the test bench simulation program initiates the execution of the test algorithm after the HDL test bench is compiled in block 209 of FIG. 2. In block 401, the computer executes the "static initializations" phase of the test algorithm which prompts an operator to input all static test constraints. These static test constraints serve as constant test parameters during the testing process and are written to the IDE controller 101 (FIG. 1) as they are entered by the operator. Values that are part of the static initialization may include, for example, the transfer mode and the number of sectors transferred.

In block 403, after a channel 103 or 109 (FIG. 1) has been statically initialized, the computer executes the continuous random phase of the test algorithm in which constrained random values are generated. In one embodiment, this block is implemented by generating a random 32 bit binary number. Bits, or fields, within this 32-bit random number represent the random data to be transmitted as well as parameters, or test constraints, such as sector transfer count, IDE drive timing, data patterns, starting addresses, a drive under test, etc. A new random number is generated for each iteration of the continuous random phase of the test algorithm. Any algorithm for generating a random number, which is well-known in the art, may be used in the present invention. In one embodiment, the random number generator is a deterministic random number generator which is well-known in the art. In such a random number generator, each successive random number is dependent on the value of the previously generated random number. The very first random number is based on a "seed" value which is entered by an operator. For example, each successive random number may be determined by XORing bits 30 and 6 of the previous number, shifting all bits to the left, etc. The source code for generating the random constraints, as used in one embodiment, is contained within the VHDL source code entitled, "Request for IDE," which is attached hereto as Appendix B.

The following examples illustrate two combinations of parameters which can be used as constraints for testing whether the IDE controller model 101 is compatible with a particular IDE drive device.

| Parameters | Value | Description |
|---|---|---|
| Example 1: Programmed I/O transfer | | |
| No. of Sectors Transferred | | Amount of Data Transferred per Read or Write Operation |
| Drive Transfer Mode | = 00 | Progammed I/O Mode |
| Drive Under Test | = 1 | Primary Slave |
| Timing Parameters | = 02/05/01 | Command Time=2 clocks, Relax Time=5 clocks, Setup Time=1 clock |
| Transfer Size | = 0 | 16-bit transfer word |
| Prefetch | = 1 | Enabled |
| Bus Master Constraints | = N.A. | Do not apply to PIO Mode |
| Example 2: DMA Transfer | | |
| No. of Sectors Transferred | | Amount of Data Transferred per Read or Write Operation |

-continued

| Parameters | Value | Description |
| --- | --- | --- |
| Drive Transfer Mode | = 10 | Multi-word DMA |
| Drive Under Test | = 0 | Secondary Master |
| Timing Parameters | = 05/04/xx | Command Time=5 clocks, Relax Time=4 clocks, Setup Time=xx |
| Transfer Size | = N.A. | Does not apply |
| Prefetch | = N.A. | Does not apply |
| Bus Master Constraints: | | |
| PRD Memory Address | = 0x00000030 | Physical adrs of PRD (Phy. Region Descr) |
| Number of PRD | = 2 | Number of PRD linked together |
| Memory Transfer Start | = 0x00100000 | Physical address of data to be transferred |
| Transfer Byte Count | = 0x0F00 | |

In block 405, after the generation of the random constraints in block 403, the IDE controller 101 is programmed for a mode of operation in accordance with the random constraints. This is called the "initialization" block. This process of initialization is performed with host bus read and write commands generated by the BFM pattern driver 117 (FIG. 1), which are transmitted via the host request module 305 (FIG. 3) as mentioned above. The next phase of the test algorithm can proceed when the IDE controller channel (primary 103 or secondary 109) is completely initialized. Because the initialization of two or more channels of the IDE controller 101 may occur simultaneously, the host request module 305 may arbitrate the various read and write commands sent to each channel by the respective primary and secondary control modules, 301 and 303.

In block 407, after a particular channel of the IDE controller has been initialized in block 405, the computer proceeds to the "execution" phase, in which it performs synchronized data transfers to a designated IDE drive 105, 107, 111 or 113 (FIG. 1). Synchronization may require that the designated IDE drive is first programmed to receive data at a preselected address, and that its interrupt is accepted after a data transfer has been completed. Each phase of the test algorithm may be synchronized within each channel by means of interrupts which are generated by the designated IDE device. After the primary master drive 105, for example, has received a read or write command from the primary control module 301, via the host interface 115 (FIG. 1), the master drive 105 may generate a request signal and send this request signal to the host request module 305 (FIG. 3). Upon being granted access to the host interface 115 by the host request module 305, data transfer between the primary control module 301 and the primary master drive 105 may commence. This data transfer may continue until it is interrupted by an interrupt signal generated by the primary master drive 105 and received by the primary control module 301 within the BFM pattern driver 117 (FIGS. 1 and 3). Upon receiving this interrupt signal, the primary control module 301 knows that the data transfer for a particular read or write command has been completed. At this point, the primary control module 301 will execute a next read or write command or initiate the next phase of the algorithm.

After the execution phase of block 407 has been completed, the computer moves to block 409 and enters into the verification phase, which may be synchronized with the end of the execution phase, block 407, to perform a data transfer from the designated IDE drive to the host CPU. The operation of the verification phase in block 409 is very similar to that described for the execution phase, block 407. Upon receiving the interrupt signal from the primary master drive 105 (FIG. 1), for example, signalling the completion of the execution phase, the primary control module 301 may send a request signal to the host request module 305 (FIG. 3) to initiate data transfer for the verification phase. After the host request module 305 has granted access to the host interface 115 (FIG. 1), the primary master drive 105 may write data to the primary control module 301 (FIG. 3) until a specified amount of data has been written. The completion of this data transfer may be indicated by an interrupt signal sent to the primary control module 301 by the primary master drive 105. Once this interrupt signal is received by the primary control module 301, the primary central module knows that the verification data transfer has been completed. The data transferred from the primary master drive 105 should be identical to the data that was transferred to the drive 105 during the execution block. If a miscompare occurs, the user is notified.

Upon completion of the verification process in block 409, the next block of the test algorithm is initiated in block 411 wherein it increments a counter identifying the number of completed iterations, and determines whether the selected number of iterations of the algorithm have been completed. If the iterations are not complete, the controller returns to state 407 and functions as described above. If, in state 411, it is determined that the iterations are complete, then the controller moves to state 413 indicating that the performance of the algorithm is complete.

Figure 5:
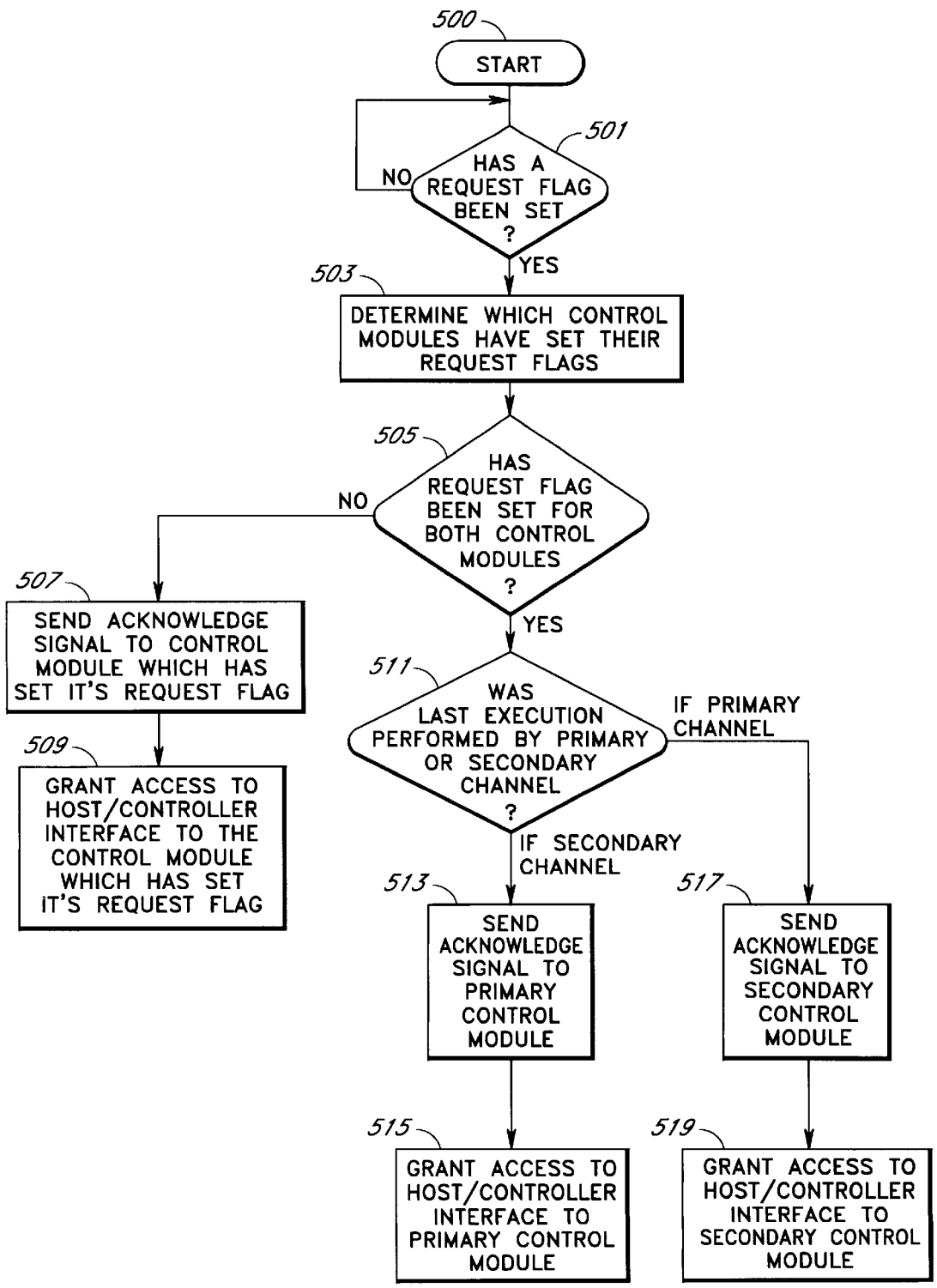
FIG. 5 is a flowchart illustrating a process of arbitrating data being communicated to and from the primary and secondary channels of an IDE controller, in accordance with the invention.

Referring to FIG. 5, the arbitration of data transfers to and from each channel may be performed by means of global request signals sent by the control modules (301 and 303 of FIG. 3). These request signals may be transmitted to the host request module 305 which then knows that the next read or write command is ready to be executed and that data needs to be transmitted to or from the designated IDE drive device. For an IDE controller model having a primary and a secondary channel, if the host request module 305 receives a request signal from both control modules 301 and 303, simultaneously, the host request module 305 may determine which control module executed the previous read or write command and will then execute the request for the other control module. For example, if the previous read command was executed by the primary control module 301, the host request module 305 may first execute a read or write command by the secondary control module 303 if both control modules 301, 303 are requesting access to the host/controller interface at the same time. In this manner, the host request module 305 may arbitrate between the read and write commands for each control module 301 and 303, thereby allowing concurrent testing of each channel of the IDE controller by their respective control modules.

As shown in FIG. 5, in block 501, the host request module 305 first determines whether a request signal, or flag, has been set by a control module 301 or 303. In block 503, the host request module 305 determines which control modules 301, 303 have requested access to the host interface 115. In block 505, if the host request module 305 determines that a request flag has not been set by both control modules 301 and 303, in block 507, it will send an acknowledgment signal, acknowledging receipt of the request signal to the respective control module 301 or 303 which has set the request flag. In block 509, the host request module 305 executes the data transfer requested by the read or write command on the channel 103, 109 (FIG. 1) corresponding to the control module 301, 303 which has set its request flag. If, on the other hand, a request flag has been set by both control modules 301, 303, the host request module 305 then determines, in block 511, which control module performed the previous execution. In block 513, if the previous read or write execution was performed by the secondary control module 303, the host request module 305 may send an acknowledge signal to the primary control module 301 and then, in block 515, execute the read or write command for the primary control module 301. If the last execution was performed by the primary control module 301 the host request module 305, in block 517, may send an acknowledgement signal to the secondary control module 303 and then executes the read or write command for the secondary control module 303. Thus, arbitration of data transfers of both the primary and secondary channels 103, 109 (FIG. 1) through the host interface model 117 may be accomplished by the request/acknowledge protocol described above.

It is well known in the art that data can be transferred through an IDE controller in one of two ways: via programmed I/O (PIO) or via direct memory access (DMA), otherwise known as a bus master transfer. Depending on the random constraint which was generated in block 403, data is transferred during the execution phase (block 405) and the verification phase (block 407) in one of these two modes.

For a PIO data transfer, a host CPU first transmits the desired memory addresses of the device to be accessed to the IDE controller. For a write access, the host CPU places the data to be transferred on the data lines which carry the data to the desired memory address; for a read access, the controller receives the data from the specified memory locations of the device and places this data on the data lines (i.e., host interface bus) to be transmitted to the host CPU. The data is then read by the host CPU or the IDE controller, depending on the direction of the transfer, read or write. This process is called PIO because, in contrast to DMA, every read or write operation must be individually programmed. PIO data access is well known in the art.

Regarding direct memory access (DMA) transfers, apart from the initial request, these types of transfers take place without intervention by the CPU. This is particularly advantageous in multi-tasking systems because while one process waits for its I/O access to be completed, the CPU is free to do computations for other processes. The process of DMA is performed by means of a register level programming interface for a bus master ATA compatible (IDE) disk controller that directly moves data between IDE devices and the main memory of the system. By performing the IDE data transfer as a bus master, the bus master device off-loads the CPU (no programmed I/O for data transfer) and improves system performance in multi-tasking environments. As used herein, as well as in the industry, generally, bus master operation is synonymous with DMA. Bus master operation is designed to work with any IDE device that supports DMA transfers on the IDE bus.

Although the present invention tests the operation of an IDE controller model for both PIO and DMA modes of data acquisition, the following discussion will describe the operation of the test bench of the present invention as it simulates the DMA mode of operation of an IDE controller model.

The register level programming mentioned above for bus master transfers is typically accomplished by means of a command register and a status register for each channel of the IDE controller. These registers may be modeled in the VHDL programming language. The command register dictates whether the current operation is a read or write function by setting a bit to indicate the appropriate function. For example, when bit 3 is set to 0, PCI bus master reads are performed. When set to 1, PCI bus master writes are performed. The command register also enables bus master operation of the controller. For example, bus master operation begins when bit 0 is detected changing from a 0 to a 1. The controller will transfer data between the IDE device and memory only when this bit is set. This bit is intended to be reset after the data transfer is completed, as indicated by either the bus IDE active bit or the interrupt bit of the bus master IDE status register.

The bus master IDE status register indicates such parameters as whether a read or write operation is simplex only: whether or not both bus master channels (primary and secondary) can be operated at the same time. For example, if bit 7 of the status register is set to "0," then the channels operate independently and can be used at the same time. If this bit is a "1," then only one channel may be used at a time. The status register can also indicate whether a drive is capable of DMA transfers. Furthermore, among other functions, the status register can indicate whether the bus master IDE channel is active. For example, bit 0 is set when the start bit is written to the command register. Bit 0 is cleared when the last transfer of a region is performed, where end of the table (EOT) for that region is set in the region descriptor.

Before a Bus Master transfer is commenced, each channel of an IDE controller is typically programmed by a CPU with a physical region descriptor (PRD) table. In the test bench program of the invention, if a DMA transfer mode is being tested, a PRD table may be simulated as part of the VHDL IDE controller model. The IDE controller model may then be given a pointer to a PRD table which contains some number of physical region descriptors which describe areas of memory that are involved in the data transfer. The physical memory region to be transferred is described by the physical region descriptor (PRD). The data transfer will proceed until all regions described by the PRDs in a table have been transferred. Each physical region descriptor entry is typically 8 bytes in length. The first four bytes typically specify the byte address of a physical memory region. The next two bytes typically specify the count of the region in bytes (64 k byte limit per region). Bus master operation terminates when the last descriptor has been read.

Figure 6:
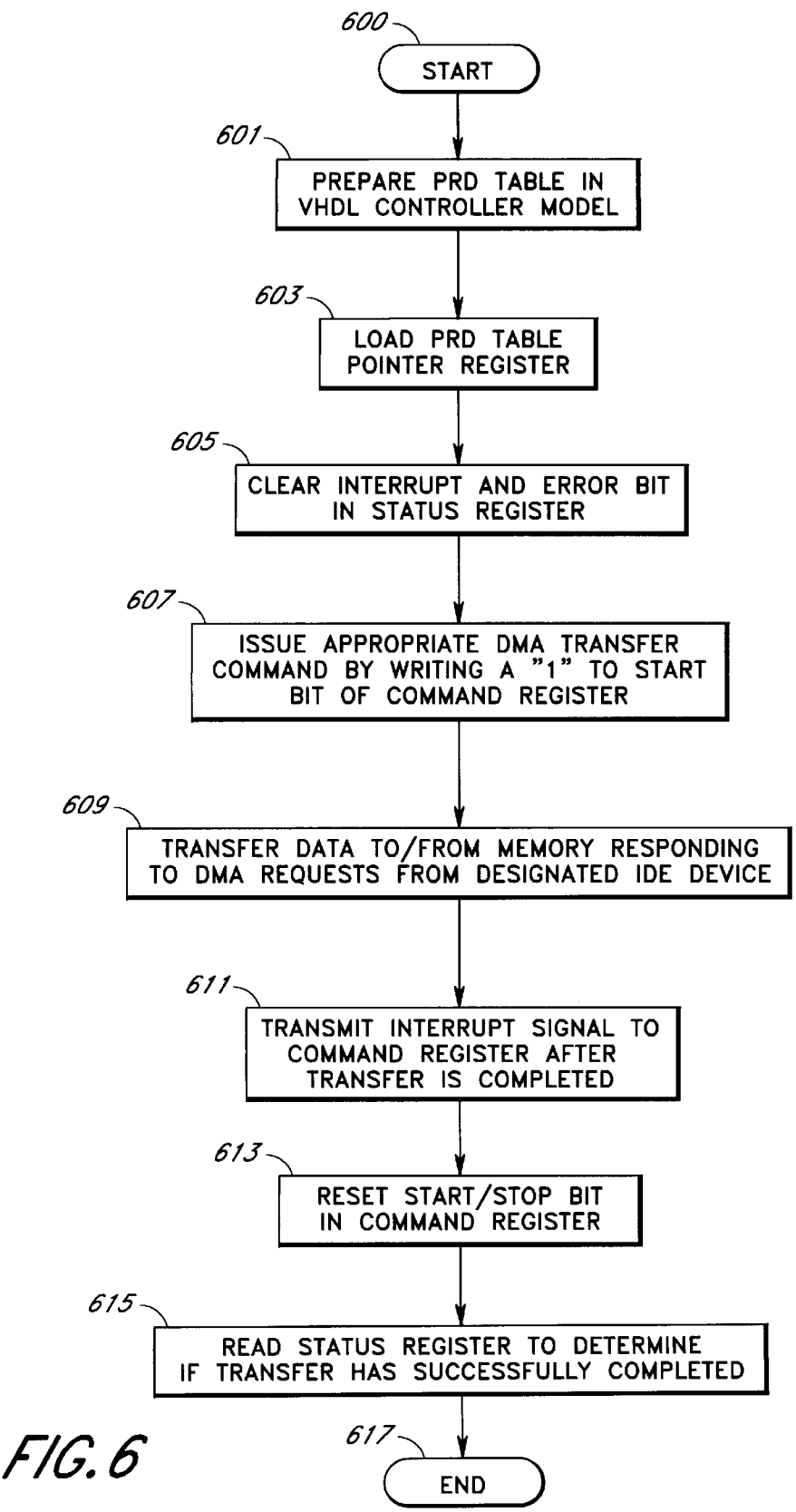
FIG. 6 is a flowchart illustrating a simulation of a DMA data transfer through an IDE controller model in accordance with the present invention.

FIG. 6 shows the process of simulating a bus master transfer between a system's main memory and an IDE slave device, for example, in the DMA mode.

After the static initialization, continuous random and initialization phases of the test algorithm of FIG. 4 have been completed, the computer will commence the execution phase 407 of the test algorithm (FIG. 4), wherein command and data transfers are performed in accordance with the test constraints established by the previous blocks. To simulate a bus master transfer, the first block, block 601, is typically to prepare a PRD Table in the VHDL IDE controller model. Each PRD is typically 8 bytes long and consists of an address pointer to the starting address and the transfer count of the memory buffer to be transferred. In block 603, the computer, which executes the test bench simulation program, then provides the starting address of the PRD Table by loading the PRD Table Pointer Register. In block 605, the Interrupt bit and Error bit in the Status register are then cleared. In block 607, the computer issues the appropriate DMA transfer command to the disk device by writing a "1" to the Start bit in the Bus Master IDE Command Register for the appropriate channel. The direction of the transfer is specified by setting the Read/Write Control bit. In block 609, the IDE controller transfers data to/from memory responding to DMA requests from the IDE device. In block

611, at the end of the transfer the IDE device signals an interrupt. In block 613, in response to the interrupt, the simulation program resets the Start/Stop bit in the command register. Finally, in block 615, the computer then reads the controller status register to determine if the transfer completed successfully (block 615).

Table 1 below describes how to interpret the Interrupt and Active bits in the Controller status register after a DMA transfer has been started.

TABLE 1

| Interrupt | Active | Description |
|---|---|---|
| 0 | 1 | DMA transfer is in progress. No interrupt has been generated by the IDE device. |
| 1 | 0 | The IDE device generated an interrupt. The controller exhausted the Physical Region Descriptors. This is the normal completion case where the size of the physical memory regions was equal to the IDE device transfer size. |
| 1 | 1 | The IDE device generated an interrupt. The controller has not reached the end of the physical memory regions. This is a valid completion case where the size of the physical memory regions was larger than the IDE device transfer size. |
| 0 | 0 | This bit combination signals an error condition. If the Error bit in the status register is set, then the controller has some problem transferring data to/from memory. Specifics of the error have to be determined using bus-specific information. If the Error bit is not set, then the size of the physical memory regions is smaller than the IDE transfer size. |

By simulating data transfers between an IDE device and a system's main memory under various test conditions, such as DMA transfer mode, the test bench of the present invention provides an efficient and comprehensive method of automatically testing IDE controller models. Through VHDL software, the test bench can simulate an IDE controller model, a bus functional model and various IDE drive devices to test the IDE controller model in its various modes of operation. The bus function model may be created and programmed to automatically configure the IDE controller model with a set of operational constraints, using a random number generator, and to perform one or more data transfers to and from the IDE controller in order to verify that the data patterns returning from the IDE controller match a correct set of expected values. Because the random number generator automatically tests different combinations of operational constraints, the cumbersome task of inputting these different combinations of operational constraints by a human operator is eliminated, and consequently, the design of an IDE controller model is more efficiently and comprehensively tested.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of testing an IDE controller design, comprising the acts of:
   providing an IDE controller model having a primary and secondary channel and a host interface;
   transmitting data patterns from a pattern driver model to a primary device model via a primary channel and to a secondary device model via a secondary channel;
   receiving the data patterns into the pattern driver model from the primary device model via the primary device channel and from the secondary device model via the secondary device channel;
   arbitrating the transfer of the data patterns to and from the primary and secondary device models via a request/acknowledge protocol on a host interface; and
   determining whether the data patterns returned from the primary and secondary device models match expected values.

2. The method of claim 1 further comprising the acts of:
   generating random test constraints; and
   programming the IDE controller with the random test constraints.

3. The method of claim 2 further comprising the act of randomly generating the data patterns.

4. The method of claim 3 further comprising the act of generating a random binary number having a specified number of bits, wherein the random test constraints and the random data patterns are each represented by at least one bit of the random binary number.

5. The method of claim 1 wherein the act of arbitrating the transmission of data patterns across the host interface is performed on a first come, first serve basis.

6. The method of claim 5 further comprising the acts of:
   providing a primary control module for transmitting the data patterns to and from the primary device model; and
   providing a secondary control module for transmitting the data patterns to and from the secondary device model.

7. The method of claim 6 wherein the act of arbitrating comprises the acts of:
   determining if a request flag is set by either the primary or secondary control modules;
   determining if both the primary and secondary control module have set their request flags;
   sending an acknowledgement signal to the primary control module in order to grant access to the host interface, if the primary control module has set its request flag and the secondary control module has not set its request flag;
   sending an acknowledgement signal to the secondary control module in order to grant access to the host interface, if the secondary control module has set its request flag and the primary control module has not set its request flag;
   determining which control module was the last one to have been granted access to the host interface if both the primary and secondary control modules have set their request flags;
   granting access to the secondary control module, if both the primary and secondary control modules have set their request flags and the last access to the host interface was granted to the primary control module; and
   granting access to the primary control module, if both the primary and secondary control modules have set their request flags and the last access to the host interface was granted to the secondary control module.

8. The method of claim 1 further comprising the acts of:
   randomly generating the data patterns;
   generating random test constraints; and
   programming the IDE controller model with the random test constraints such that the data patterns are transmitted through the IDE controller model in accordance with the random test constraints.

9. The method of claim 8 further comprising the act of generating a random binary number having a specified number of bits, wherein the random test constraints and the random data patterns are fields within the random number.

10. A method of testing an IDE controller, comprising the acts of:
   transmitting primary data patterns from a pattern driver model to a primary IDE device model via a primary channel;
   transmitting secondary data patterns from the pattern driver model to the secondary IDE device model via a secondary channel;
   transmitting primary data patterns from the primary device model to the pattern driver model via the primary channel;
   transmitting secondary data patterns from the secondary device model to the pattern driver model via the secondary channel;
   arbitrating the transmissions of the primary and secondary data patterns via a request/acknowledge protocol on a host interface; and
   determining whether the primary and secondary data patterns transmitted to the pattern driver model match expected values.

11. The method of claim 10 further comprising the acts of:
   generating primary random test constraints;
   programming the IDE controller model with the primary random test constraints such that the primary data patterns are communicated to and from the primary device model, via the primary channel, in accordance with the primary random test constraints;
   generating secondary random test constraints; and
   programming the secondary channel with the secondary random test constraints such that the secondary data patterns are communicated to and from the secondary device model, via the secondary channel, in accordance with the secondary random test constraints.

12. The method of claim 11 further comprising the act of:
   generating a primary random binary number having a specified number of bits, wherein the primary random test constraints and the primary data patterns are fields within the primary random number; and
   generating a secondary random binary number having a specified number of bits, wherein the secondary random test constraints and the secondary data patterns are fields within the secondary random number.

13. The method of claim 11 wherein the act of arbitrating access to the host interface is performed on a first come, first serve basis.

14. The method of claim 13 wherein the pattern driver model comprises a primary control module, a secondary control module and a host request module, coupled to the host interface, wherein the primary control module generates the primary data patterns, the secondary control module generates the secondary data patterns, and the host request module arbitrates access to the host interface.

15. The method of claim 14 wherein the act of arbitrating comprises the acts of:
   determining if a request flag is set by either the primary or secondary control modules;
   determining if both the primary and secondary control modules have set their request flags;
   sending an acknowledgement signal to the primary control module in order to grant access to the host interface, if the primary control module has set its request flag and the secondary control module has not set its request flag;
   sending an acknowledgement signal to the secondary control module in order to grant access to the host interface, if the secondary control module has set its request flag and the primary control module has not set its request flag;
   determining which control module was the last one to have been granted access to the host interface if both the primary and secondary control modules have set their request flags;
   granting access to the secondary control module, if both the primary and secondary control modules have set their request flags and the last access to the host interface was granted to the primary control module; and
   granting access to the primary control module, if both the primary and secondary control modules have set their request flags and the last access to the host interface was granted to the secondary control module.

16. The method of claim 11 further comprising the acts of:
   synchronizing the transmission of the primary data patterns across the primary channel such that the transmission of the primary data patterns to the pattern driver model does not begin until a specified number of the primary data patterns have first been transmitted to the primary device model; and
   synchronizing the transmission of the secondary data patterns across the secondary channel such that the transmission of the secondary data patterns to the pattern driver model does not begin until a specified number of the secondary data patterns have first been transmitted to the secondary device model.

17. A method of testing an IDE controller, comprising the acts of:
   testing a primary channel by transmitting a first set of test data generated in a pattern driver model across the primary channel;
   testing a secondary channel by transmitting a second set of test data generated in the pattern driver model across the secondary channel, wherein the secondary channel is tested concurrently with the primary channel; and
   arbitrating access between the primary and secondary channels via a request/acknowledge protocol on a host interface.

18. The method of claim 17 wherein the act of arbitrating access to the host interface between the primary and secondary channels is performed on a first come, first serve basis.

19. The method of claim 18 further comprising the acts of:
   providing a primary control module for generating the first set of test data;
   providing a secondary control module for generating the second set of test data; and
   providing a host request module, coupled to the host interface, wherein the act of arbitrating is performed by a request/acknowledge protocol between the host request module and each of the primary and secondary control modules.

20. The method of claim 19 wherein the request/acknowledge protocol comprises the acts of:
   determining if a request flag is set by either the primary or secondary control modules;
   determining if both the primary and secondary control modules have set their request flags;

sending an acknowledgement signal to the primary control module in order to grant access to the host interface, if the primary control module has set its request flag and the secondary control module has not set its request flag;

sending an acknowledgement signal to the secondary control module in order to grant access to the host interface, if the secondary control module has set its request flag and the primary control module has not set its request flag;

determining which control module was the last one to have been granted access to the host interface if both the primary and secondary control modules have set their request flags;

granting access to the secondary control module, if both the primary and secondary control modules have set their request flags and the last access to the host interface was granted to the primary control module; and granting access to the primary control module, if both the primary and secondary control modules have set their request flags and the last access to the host interface was granted to the secondary control module.

* * * * *

UNITED STATES PATENT AND TRADEMARK OFFICE
CERTIFICATE OF CORRECTION

PATENT NO. : 6,076,180
DATED : June 13, 2000
INVENTOR(S) : James W. Myer

It is certified that error appears in the above-identified patent and that said Letters Patent is hereby corrected as shown below:

Column 2,
Line 12, please delete "constaints" and insert therefor -- constraints --

Column 11,
Line 65, please delete "from a pettern driver model to a primary device model via a primary channel and to a secondary device model via a secondary channel; and" and insert therefor -- "patterns to a primary and secondary device model; --

Column 12,
Line 1, please delete "into the pattern driver model from the primary device model via the primary device channel and from the secondary device model via the secondary device channel; and" and insert therefor -- "patterns from the primary and secondary device models; --

Column 13,
Line 10, please delete "model via a primary channel;" and insert therfor -- model; --
Line 13, please delete "IDE device model via a secondary channel," and insert therefor -- model --
Line 16, please delete "model via the primary channel;" and insert therefor -- model; --
Line 19, please delelte "model via the secondary channel" and insert therefor -- model; --
Line 22, please delelte "patterns via a request/acknowledge protocol on a host interface;" and insert therefor -- patterns; --

Column 14,
Line 38, please delete "generated in a pattern driver model"
Line 42, please delete "generated in the pattern driver model"
Line 45, please delete "via a request/acknowledge protocol on a host interface"

Signed and Sealed this

Seventeenth Day of August, 2004

JON W. DUDAS
*Acting Director of the United States Patent and Trademark Office*